US012449247B2

(12) United States Patent
Heumann et al.

(10) Patent No.: US 12,449,247 B2
(45) Date of Patent: Oct. 21, 2025

(54) SCALE ELEMENT FOR AN INDUCTIVE POSITION MEASURING DEVICE

(71) Applicant: DR. JOHANNES HEIDENHAIN GmbH, Traunreut (DE)

(72) Inventors: Martin Heumann, Traunstein (DE); Christoph Heinemann, Übersee (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 161 days.

(21) Appl. No.: 18/437,809

(22) Filed: Feb. 9, 2024

(65) Prior Publication Data
US 2024/0288258 A1 Aug. 29, 2024

(30) Foreign Application Priority Data

Feb. 23, 2023 (EP) ..................... 23158098

(51) Int. Cl.
*G01B 7/00* (2006.01)
*G01B 7/30* (2006.01)
(Continued)

(52) U.S. Cl.
CPC .............. *G01B 7/003* (2013.01); *G01B 7/30* (2013.01); *G01D 5/20* (2013.01); *G01D 5/2053* (2013.01);
(Continued)

(58) Field of Classification Search
CPC . G01B 7/003; G01B 7/30; G01B 7/00; G01B 7/14; G01D 5/20; G01D 5/24442;
(Continued)

(56) References Cited

U.S. PATENT DOCUMENTS

2005/0077457 A1* 4/2005 Hofer ................. G01D 5/38
250/231.13
2007/0028476 A1* 2/2007 Hermann ............ G01D 5/38
33/707
(Continued)

FOREIGN PATENT DOCUMENTS

DE 102018213400 A1 2/2020
DE 102019214219 A1 3/2021

OTHER PUBLICATIONS

European Search Report issued in EP Patent Application No. 23158098, dated Jul. 5, 2023, pp. 1-2.

*Primary Examiner* — Raul J Rios Russo
(74) *Attorney, Agent, or Firm* — Carter, DeLuca & Farrell LLP

(57) ABSTRACT

A scale element for an inductive position measuring device includes a substrate on which a graduation track is arranged. The graduation track is formed along a measuring direction from a periodic sequence of alternately arranged electrically conductive graduation regions and non-conductive graduation regions. The electrically conductive graduation regions are formed from a layer of electrically conductive material. At least one bore is arranged in the substrate for fastening the scale element to a machine part. The electrically conductive graduation regions have an opening, in which the electrically conductive material encloses the opening. In at least one of the electrically conductive graduation regions, the bore is arranged in the substrate through the opening.

20 Claims, 3 Drawing Sheets

(51) Int. Cl.
  *G01D 5/20* (2006.01)
  *G01D 5/244* (2006.01)
(52) U.S. Cl.
  CPC ..... *G01D 5/24442* (2013.01); *G01D 2205/77* (2021.05)
(58) Field of Classification Search
  CPC ... G01D 2205/77; G01D 5/2053; G01R 33/02
  USPC .................................................. 324/207.13
  See application file for complete search history.

(56) References Cited

U.S. PATENT DOCUMENTS

2020/0124415 A1\* 4/2020 Schwaiger ........... G01D 5/2053
2022/0341757 A1 10/2022 Auer \* cited by examiner

SCALE ELEMENT FOR AN INDUCTIVE POSITION MEASURING DEVICE

CROSS-REFERENCE TO RELATED APPLICATIONS

The present application claims priority to application Ser. No. 23/158,098.6, filed in the European Patent Office on Feb. 23, 2023, which is expressly incorporated herein in its entirety by reference thereto.

FIELD OF THE INVENTION

The present invention relates to a scale element for an inductive position measuring device, e.g., for determining an angular position or a linear position of the scale element relative to a sensing element.

BACKGROUND INFORMATION

Inductive position measuring devices are used, for example, as angle measuring devices to determine an angular position of machine parts that can be rotated relative to one another. In inductive position measuring devices, excitation tracks and receiving tracks, for example, in the form of conductive paths, are often applied to a common printed circuit board, which usually has multiple layers and is firmly connected, for example, to a stator of the position measuring device. Opposite this printed circuit board is a scale element on which graduation structures are applied and which is firmly connected to a movable part of the position measuring device. When a time-varying electrical excitation current is applied to the excitation tracks, signals dependent on the position are generated in the receiving tracks during the relative movement between the scale element and the sensing element. These signals are then further processed in an evaluation electronics system.

A scale element for an inductive angle measuring device is described in European Patent Document No. 3 929 539 and U.S. Pat. No. 11,506,516. The scale element includes two graduation tracks, consisting of a periodic sequence of alternately arranged electrically conductive graduation regions and non-conductive graduation regions. The scale element is fastened via mounting bores.

SUMMARY

Example embodiments of the present invention provide a compact and cost-effective scale element that can nevertheless be used in connection with a comparatively accurate inductive position measuring device.

The scale element, which is configured and intended for an inductive position measuring device, includes a substrate on which a graduation track is arranged. The graduation track is formed along a measuring direction from a periodic sequence of alternately arranged electrically conductive graduation regions and comparatively non-conductive graduation regions, in which the electrically conductive graduation regions are formed from a layer of electrically conductive material. Furthermore, at least one bore is arranged and provided in the substrate, which is configured for fastening the scale element to a machine part. The electrically conductive graduation regions have an opening, in which the electrically conductive material encloses the opening. In addition, in at least one of the electrically conductive graduation regions, the bore is arranged in the substrate through the opening.

The electrically conductive graduation regions are thus formed from a layer of electrically conductive material. The comparatively non-conductive graduation regions can be made of plastic (e.g., printed circuit board material). The scale element may, for example, have plastic printed circuit board material as a substrate. Alternatively, the substrate can be formed from a layered body including a relatively thick steel layer and a non-conductive layer (e.g., plastic layer), and the steel layer is arranged on the side of the scale element facing away from the graduation regions. The phrase comparatively non-conductive refers, for example, to the ratio of the electrical conductivities of the materials of the alternately arranged graduation regions. For example, this ratio may be greater than 10, greater than 50, etc. The layer of electrically conductive material of the electrically conductive graduation regions is, for example, larger or thicker than 12 µm or 0.012 mm. On the other hand, it may be provided, e.g., for economic reasons, that the layer is thinner than 1 mm, thinner than 0.5 mm, thinner than 0.1 mm, etc.

In the following description, the term bore should be understood to mean, for example, a hole that does not necessarily have to be round. For example, the bore may also be angular or elliptical in shape and produced by a punching or milling process, for example.

The scale element is used in an angle measuring device to determine an angular position relative to a sensing element. The scale element is arranged rotatably about an axis relative to the sensing element, so that the measuring direction represents the circumferential direction in relation to the axis.

For example, the graduation track is formed in the shape of a ring or a circular ring, in which, for example, the center point of the ring-shaped graduation track is located on the axis.

For example, the openings in the electrically conductive graduation regions are geometrically identical.

For example, the graduation track extends along a graduation circle line with the center point, which, e.g., is located on the axis, and the openings are arranged such that they have the same distance from the center point and are arranged equidistantly along the graduation circle line.

For example, the scale element includes several electrically conductive graduation regions having bores. The bores are arranged so that they have the same distance from the center point and are arranged equidistantly along the graduation circle line.

The distances between the openings or between the bores are specified in degrees and refer to a center angle αround the axis or around the center point of the graduation circle line.

For example, the ring-shaped scale element has an inner diameter d and an outer diameter D, in which the relationship $D/d<3$ is satisfied. Accordingly, the scale element has a relatively large inner diameter d, for example.

According to example embodiments, the scale element includes at least one fastening element arranged in the bore. The fastening element may be arranged flush or recessed with respect to the electrically conductive graduation regions in relation to the axial direction and in any case does not project beyond the surface of the electrically conductive graduation regions in the axial direction. In the following description, axial direction refers, for example, to a direction that is oriented parallel to the axis.

For example, the fastening element is produced from electrically conductive material and may be configured as a screw. Alternatively, a rivet, a metal pin, a dowel pin, etc., may be provided as a fastening element, and it may be provided that the scale element is additionally glued to the machine part to which it is fastened. For example, the fastening element can be used to produce a form lock, which is important for a functionally safe arrangement. At the same time, the fastening element can be used to center the scale element. For example, a configuration is also possible in which centering lugs or centering blades are pressed into the bores and the scale element is additionally fixed with an adhesive connection.

For example, the scale element includes a plurality of fastening elements, and the scale element includes a plurality of the electrically conductive graduation regions, which have bores, in which the fastening elements are arranged.

According to example embodiments, an inductive position measuring device includes the scale element and a sensing element.

Further features and aspects of example embodiments of the present invention are described in more detail below with reference to the appended schematic Figures.

DETAILED DESCRIPTION

Figure 1:
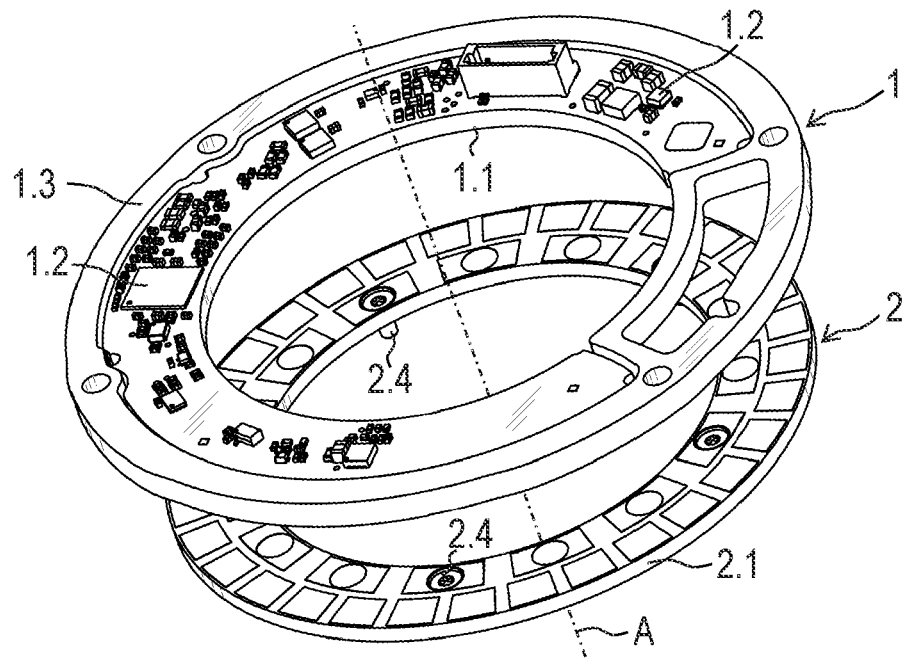
FIG. 1 is perspective view of an angle measuring device including a sensing element and a scale element.

Referring, for example, to FIG. 1, an angle measuring device includes a sensing element 1 which can be used for capturing an angular position of a scale element 2. The scale element 2 is rotatably arranged about an axis A relative to the sensing element 1. Such an angle measuring device can be used, for example, in a drive device, in which the scale element 2 is rotationally fixed to a drive shaft of a motor, for example.

The sensing element 1 includes a printed circuit board 1.1, which has a plurality of layers, and electronic components 1.2, which are mounted on the printed circuit board 1.1. The printed circuit board 1.1 also includes a frame 1.3 as a mechanical supporting structure.

Figure 2:
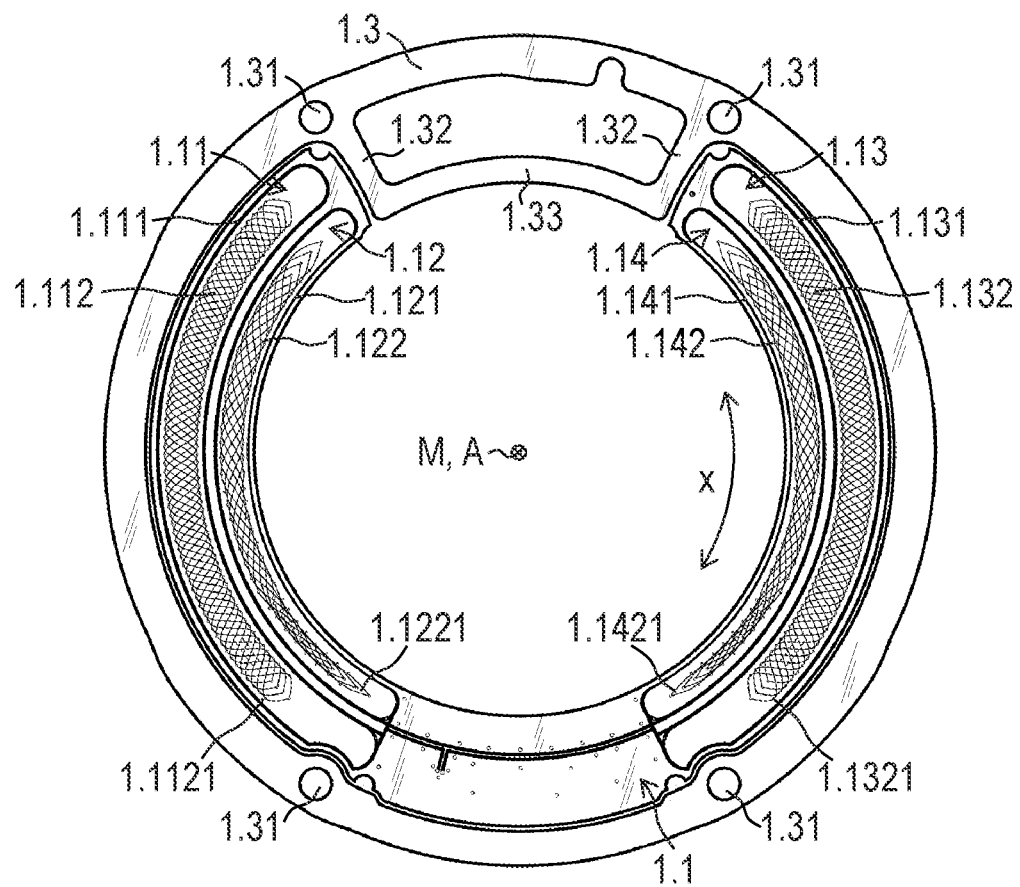
FIG. 2 is a top view of one side of the sensing element.

As also illustrated in FIG. 2, the printed circuit board 1.1 has the shape of a circular ring segment, which extends around approximately 300° and, accordingly, has an opening. The closed and substantially ring-shaped frame 1.3, e.g., made of metal, is fastened around the outside of the printed circuit board 1.1, and ring-shaped frame 1.3, e.g., mechanically reinforces the sensing element 1 and has fastening regions 1.31, e.g., in the form of bores. In the region of the opening of the printed circuit board 1.1, webs 1.32 of the frame 1.3 extend substantially in a radial direction parallel to the end faces of the printed circuit board 1.1. Another web 1.33 of the frame 1.3 extends over an angle of approximately 60° in a circular segment contour.

The sensing element 1 is used to sense the first scale element 2. As illustrated, the electronic components 1.2 are only mounted on one side of the printed circuit board 1.1, e.g., on the side facing away from the scale element 2. Alternatively or additionally, it is possible to provide both sides of the printed circuit board 1.1 with electronic components 1.2.

To determine the angular information, the printed circuit board 1.1 has a first detector unit 1.11, a second detector unit 1.12, a third detector unit 1.13, and a fourth detector unit 1.14, as illustrated in FIG. 2. The detector units 1.11 to 1.14 have a ring-segment-like shape, and the center point M of the ring-segment-like shape of each of the detector units 1.11 to 1.14 is located on the axis A. Accordingly, the detector units 1.11 to 1.14 are arranged, in a first approximation, concentrically opposite each other with respect to the center point M.

The first detector unit 1.11 includes a first excitation track 1.111 and a first receiving track 1.112. Similarly, the second detector unit 1.12 includes a second excitation track 1.121 and a second receiving track 1.122, the third detector unit 1.13 includes a third excitation track 1.131 and a third receiving track 1.132, and the fourth detector unit 1.14 includes a fourth excitation track 1.141 and a fourth receiving track 1.142.

Each excitation track 1.111, 1.121, 1.131, 1.141 encloses a respective one of the receiving tracks 1.112, 1.122, 1.132, 1.142. Both the excitation tracks 1.111, 1.121, 1.131, 1.141 and the receiving tracks 1.112, 1.122, 1.132, 1.142 extend along a circumferential direction x.

For example, and as illustrated, each of the receiving tracks 1.112, 1.122, 1.132, 1.142 respectively includes four receiving conductive paths 1.1121, 1.1221, 1.1321, 1.1421, which are arranged offset in the circumferential direction x, so that they can provide four phase-shifted signals in accordance with the offset. In the illustrated example embodiment, within a receiving track 1.112, 1.122, 1.132, 1.142, adjacent receiving conductive paths 1.1121, 1.1221, 1.1321, 1.1421 are arranged offset from one another by ⅛ of the full sine period (by $\pi 4$ or 45° along the circumferential direction x).

As illustrated in the Figures, the receiving conductive paths 1.1121, 1.1221, 1.1321, 1.1421, which belong to one and the same receiving track 1.112, 1.122, 1.132, 1.142 are indicated with only one reference numeral. Thus, for example, all receiving conductive paths 1.1121 of the first receiving track 1.112 are indicated by only one reference numeral. In addition, the first receiving conductive paths 1.1121, 1.1221, 1.1321, 1.1421 of the detector units 1.11 to 1.14 are connected by vias and are arranged in different layers of the printed circuit board 1.1, so that undesirable short circuits are avoided at crossing points. Although, strictly speaking, each of the receiving conductive paths 1.1121, 1.1221, 1.1321, 1.1421 includes many conducting pieces, each of which is distributed and strung together on two planes or layers, in the following description, such a structure is collectively referred to as a receiving conductive path 1.1121, 1.1221, 1.1321, 1.1421.

Figure 3:
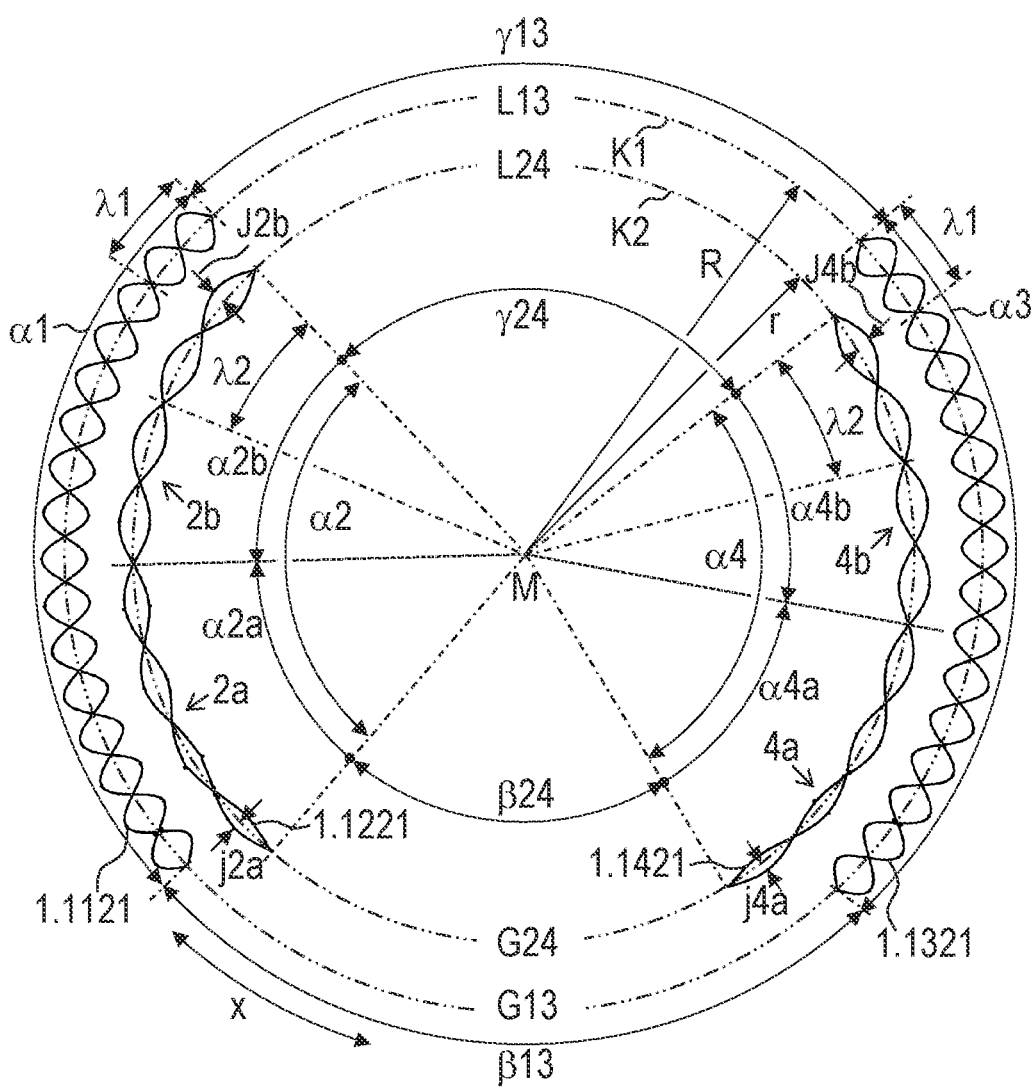
FIG. 3 is a top view of the scanning element.

For clarity, only one receiving conductive path 1.1121, 1.1221, 1.1321, 1.1421 of the receiving tracks 1.112, 1.122, 1.132, 1.142 is illustrated in FIG. 3. The following explanations are based on this representation of a single receiving conductive path 1.1121, 1.1221, 1.1321, 1.1421, in which the conditions also apply to the phase-shifted receiving conductive paths 1.1121, 1.1221, 1.1321, 1.1421.

The first receiving conductive path 1.1121 and the third receiving conductive path 1.1321 are arranged along a first circular line K1, which has a first radius R. The second receiving conductive path 1.1221 and the fourth receiving conductive path 1.1421 are arranged along a second circular line K2, which has a second radius r; the second radius r is smaller than the first radius R, so that the following condition is satisfied:

r<R

Both circular lines K1, K2 have the same center point M. The receiving conductive paths 1.1121, 1.1221, 1.1321, 1.1421 have a spatially periodic course that is substantially sine-shaped or sinusoidal. The first receiving conductive paths 1.1121 of the first receiving track 1.112 and the third receiving conductive paths 1.1321 of the third receiving track 1.132 have a constant first period length λ1 throughout their contour. In contrast, the second receiving conductive paths 1.1221 of the second receiving track 1.122 and the fourth receiving conductive paths 1.1421 of the fourth receiving track 1.142 have a constant second period length λ2 throughout their contour. For example, the second period length λ2 is larger than the first period length λ1, i.e.:

λ2>λ1

The period lengths λ1, λ2 are given here in degrees and refer to a respective center angle α around the axis A or around the center point M. In the illustrated example embodiment, the first period length λ1 is 360°/32, i.e., 11.25°, and the second period length λ2 is 360°/15, i.e., 24°.

Thus, the first period length λ1 is an integer first divisor S of 360°, in which S=32 and S∈ ℕ.

Analogously, the second period length λ2 is an integer second divisor T of 360°, in which T=15 and T∈ ℕ.

The first divisor S and the second divisor T are coprime, i.e., S∜T.

The second receiving conductive paths 1.1221 and the fourth receiving conductive paths 1.1421 are arranged such that there is a first gap G24 and a second gap L24 between them in the circumferential direction x, in which the second receiving conductive paths 1.1221 extend over a second arc length α2 and the fourth receiving conductive paths 1.1421 extend over a fourth arc length α4. The following relationships are satisfied in the illustrated example embodiment:

$$\alpha 2 = p \cdot \alpha 2$$
$$\alpha 4 = q \cdot \alpha 2$$
$$\alpha 2 = \alpha 4, \text{ since } p = q$$
$$\text{with } p, q \in \mathbb{N}$$

For example, p=q=4, such that α2=4×24°=96°=α4. Consequently, the second receiving conductive paths 1.1221 and the fourth receiving conductive paths 1.1421 respectively extend over an equal arc length α2, α4, which corresponds to four second period lengths λ2.

The first gap G24 extends over a first gap length β24, and the second gap L24 extends over a second gap length γ24. The first gap length β24 is a first multiple m of the second period length λ2, in which m=3. In addition, the second gap length γ24 is a second multiple n; in the illustrated example embodiment, n=4. In principle, natural numbers greater than zero can be used for m and n. The following relationships are satisfied:

$$\beta 24 = m \cdot \lambda 2$$
$$\gamma 24 = n \cdot \lambda 2$$

-continued
$$m \neq n,$$
$$\text{with } m, n \in \mathbb{N}$$

In addition, the sum of m and n is an odd number, i.e., m+n=2·k+1, with k∈ ℕ.

With regard to the forming of an absolute angle measurement value, e.g., for forming a connection or a link with the first and third receiving tracks 1.112, 1.132, it is considered generally advantageous for the sum of the second arc length α2, the fourth arc length α4, the first gap length β24, and the second gap length γ24 to be an odd multiple of the second period length λ2, or the second divisor T (e.g., 15) to be an odd number. For example:

$$\alpha 2 + \alpha 4 + \beta 24 + \gamma 24 = (2 \cdot k + 1) \cdot \lambda 2 \text{ or}$$
$$p + q + m + n = 2 \cdot k + 1,$$
$$\text{i.e., } 4 + 4 + 4 + 3 = 15 (= 2 \cdot 7 + 1)$$

The second receiving conductive paths 1.1221 and the fourth receiving conductive paths 1.1421 may respectively extend over an equal arc length α2, α4 (p=q). Consequently, the first gap length β24 and the second gap length γ24 must be of different lengths, provided that the arc lengths α2, α4 and the gap lengths 24, γ24 are respectively a multiple of the second period length λ2 and their sum is an odd multiple of the second period length λ2. For example, the first gap length β24 is smaller than the second gap length γ24, so that the following relationship is satisfied:

$$\beta 24 < \gamma 24 \text{ or } m < n$$

For example, the difference between the first gap length β24 and the second gap length γ24 is minimal, so that the following relationship is satisfied:

$$n - m = 1 \text{ or } \gamma 24 - \beta 24 = \lambda 2$$

The first receiving conductive paths 1.1121 and the third receiving conductive paths 1.1321 are arranged such that there is a third gap G13 and a fourth gap L13 between them in the circumferential direction x. In addition, the first receiving conductive paths 1.1121 extend over a first arc length α1, in which the following relationship is satisfied:

$$\alpha 1 = s \cdot \lambda 1$$

The third receiving conductive paths 1.1321 extend over a third arc length α3, in which the following relationships are satisfied:

$$\alpha 3 = t \cdot \lambda 1$$
$$s = t$$
$$\text{with } s, t \in \mathbb{N}$$

In the illustrated example embodiment, s=t=8, so that α1=8×11.25°=90°=α3. The first receiving conductive paths 1.1121 and the third receiving conductive paths 1.1321 thus respectively extend over an equal arc length α1, α3, which corresponds to eight first period lengths λ1.

The third gap G13 extends over a third gap length β13, and the fourth gap L13 extends over a fourth gap length γ13. The third gap length β13 is a third multiple v of the first period length λ1. In addition, the fourth gap length γ13 is a fourth multiple w; in the illustrated example embodiment, V=w=8. In principle, natural numbers greater than zero can be used for v and w. The following relationships are satisfied:

$$\beta 13 = v \cdot \lambda 1$$

$$\gamma 13 = w \cdot \lambda 1$$

in which $v = w$ and $v, w \in \mathbb{N}$

Furthermore, in the illustrated example embodiment, v and w are an even number. To form an absolute angle measurement value, it is considered generally advantageous for the sum of the first arc length α1, the third arc length α3, the third gap length β13, and the fourth gap length γ13 to be an even multiple of the first period length λ1, or the first divisor S (e.g., 32) to be an even number. For example, the following relationships are satisfied:

$$\alpha 1 + \alpha 3 + \beta 13 + \gamma 13 = (2 \cdot k) \cdot \lambda 2 \text{ or}$$

$$s + t + v + w = 2 \cdot k,$$

i.e., $8 + 8 + 8 + 8 = 32 (= 2 \cdot 16)$ with $k \in \mathbb{N}$

The third gap G13 and the fourth gap L13 extend over a multiple of the first period length λ1. In addition, the third gap G13 and the fourth gap L13 are of equal size, so that the third gap G13 extends over 90° or eight first period lengths λ1 and the fourth gap L13 also extends over 90°.

The course of the second receiving conductive paths 1.1221 has different amplitudes j2a, J2b along the circumferential direction x. There are therefore different distances between the second circular line K2 and the sinusoidally extending second receiving conductive path 1.1221 in the region of maximum deflection. For example, the course of the second receiving conductive paths 1.1221 has the first amplitude j2a within a first section 2a, in which the first section 2a extends over a first angle α2a starting from the end of the second receiving conductive path 1.1221 adjacent to the first gap G24. Within a second section 2b, the course of the second receiving conductive paths 1.1221 has a second amplitude J2b, in which the second section 2b extends over a second angle α2b starting from the other end of the second receiving conductive path 1.1221 adjacent to the second gap L24. The first and second angles α2a, α2b are less than or equal to half the second arc length α2. The first amplitude j2a is smaller than the second amplitude J2b.

An analogous consideration is also true for the fourth receiving conductive paths 1.1421. Accordingly, the course of the fourth receiving conductive paths 1.1421 has different amplitudes j4a, J4b along the circumferential direction x. There are therefore different distances between the second circular line K2 and the sinusoidally extending fourth receiving conductive paths 1.1421 in the region of maximum deflection. For example, the course of the fourth receiving conductive paths 1.1421 has the third amplitude j4a within a third section 4a, in which the third section 4a extends over a first angle α4a starting from the end of the fourth receiving conductive path 1.1421 adjacent to the first gap G24. Within a fourth section 4b, the course of the fourth receiving conductive paths 1.1421 has a fourth amplitude J4b, in which the fourth section 4b extends over a fourth angle α4b starting from the other end of the fourth receiving conductive path 1.1421 adjacent to the second gap L24. The first and fourth angles α4a, 4b are less than or equal to half the fourth arc length α4 and the third amplitude j4a is smaller than the fourth amplitude J4b. Accordingly, the following relationships are satisfied in the illustrated example embodiment:

$$j2a = j4a$$

$$J2b = J4b$$

In the illustrated example embodiment, the second and fourth receiving conductive paths 1.1221, 1.1421 not only have two different amplitudes j4a, J4b. In the regions between the two aforementioned amplitudes j4a, J4b, there are amplitudes within a respective second period length λ2, which have an intermediate magnitude, i.e., are smaller than the second amplitude J2b or fourth amplitude J4b and larger than the first amplitude j2a or third amplitude j4a.

In the illustrated example embodiment, the area spanned between the second receiving conductive paths 1.1221, i.e., the sum of the individual areas between the sinusoidal second receiving conductive paths 1.1221 (sum of all lenticular partial areas), is less than or equal to the area spanned by the fourth receiving conductive paths 1.1421.

The receiving conductive paths 1.1121, 1.1221, 1.1321, 1.1421 are electrically connected such that they provide 0° and 90° signals on the one hand and 45° and 135° signals on the other hand. A first position signal can be determined from the 0° and 90° signals, and a second position signal redundant with respect to the first position signal can be determined from the 45° and 135° signals. In addition, the first receiving conductive paths 1.1121 of the first receiving track 1.112 and the third receiving conductive paths 1.1321 of the third receiving track 1.132 are connected analogously in series with each other. Similarly, the second receiving conductive paths 1.1221 of the second receiving track 1.122 and the fourth receiving conductive paths 1.1421 of the fourth receiving track 1.142 are connected analogously in series with each other. The signals generated by the interconnected receiving conductive paths 1.1121, 1.1221, 1.1321, 1.1421 are evaluated via a common evaluation ASIC, so that an absolute position is calculated in this manner.

Figure 4:
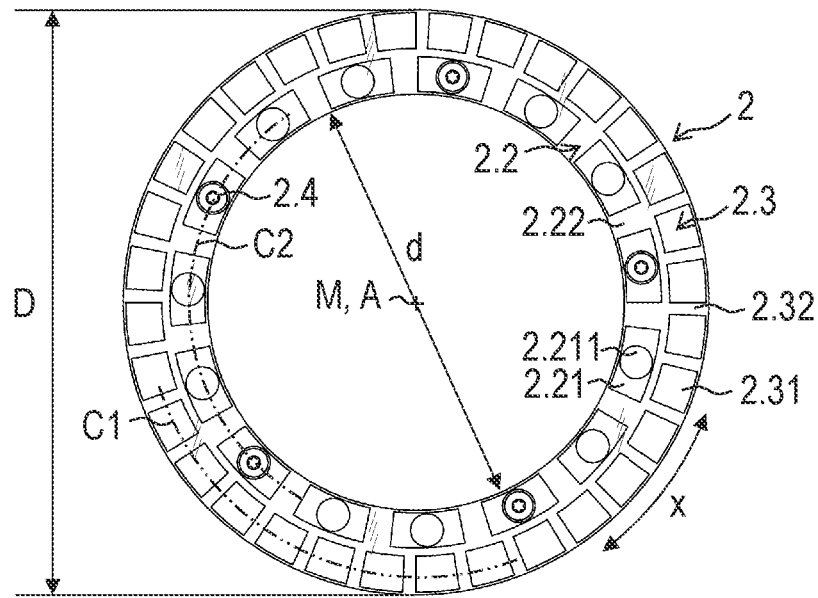
FIG. 4 is a top view of one side of a scale element.

FIG. 4 is a top view of the scale element 2. The scale element 2 has an annular or circular shape with an inner diameter d and an outer diameter D. In the illustrated example embodiment, the inner diameter d is relatively large, so that the following relationship is satisfied: D/d=1.4.

Figure 5:
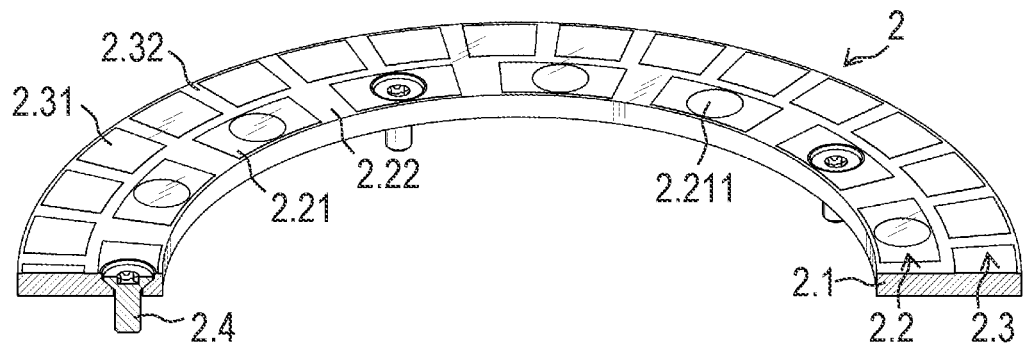
FIG. 5 is a perspective, cross-sectional view of the scale element.

The scale element 2 includes a substrate 2.1 (see, e.g., FIG. 5), which may be produced from printed circuit board material, i.e., plastic, e.g., epoxy resin, and on which two graduation tracks 2.2, 2.3 are arranged. The graduation tracks 2.2, 2.3 are formed in the shape of a ring and are arranged on the substrate 2.1, concentrically with respect to the axis A with different radii, so that the first graduation track 2.2 extends along the second graduation circle line C2 and the second graduation track 2.3 extends along the first graduation circle line C1. The graduation tracks 2.2, 2.3 include graduation structures having a periodic sequence of electrically conductive graduation regions 2.21, 2.31 and non-conductive graduation regions 2.22, 2.32 arranged alternately along the circumferential direction x; the electrically conductive graduation regions 2.21, 2.31 are formed from a layer of electrically conductive material. The thickness of this layer is 18 μm. For example, copper is applied to the substrate 2.1 as the material for the electrically conductive graduation regions 2.21, 2.31. In the non-conductive graduation regions 2.22, 2.32, on the other hand, the substrate 2.1 is not coated. With the arrangement with two graduation tracks 2.2, 2.3, the angular position of the scale element 2 can be determined absolutely. The outer graduation track 2.3 of the scale element 2 has the greater number of respective graduation regions 2.31, 2.32 along the circumferential direction x, so that through these the greater resolution with respect to the measurement of the angular position can be achieved. In the illustrated example embodiment, the second (outer) graduation track 2.3 has an even multiple of the first period length λ1, namely 32, corresponding to the sum s+t+v+w on which the geometry of the first and third receiving conductive paths 1.1121, 1.1321 is based. In contrast, the first (inner) graduation track 2.2 has the smaller number of graduation regions 2.31, 2.32 along the circumferential direction x, e.g., 15. This corresponds to the sum p+q+m+n, which is decisive for the configuration of the second receiving conductive paths 1.1221 and fourth receiving conductive paths 1.1421.

The electrically conductive graduation regions 2.21 of the first (inner) graduation track 2.2 have an opening 2.211, so that the layer of electrically conductive material is open at this point or the substrate 2.1 is not coated in this region. The electrically conductive graduation regions 2.21 are configured or arranged such that the opening 2.211 is enclosed by the electrically conductive graduation region 2.21. The openings 2.211 are arranged such that they have the same distance from the center point M and are arranged equidistantly along the second graduation circle line C2 in the circumferential direction x (e.g., at a distance of 24°). The electrically conductive material encloses the opening 2.211, so that there are webs 2.212 (see, e.g., FIG. 6) made of electrically conductive material on both sides around the opening 2.211 and there is a closed contour made of electrically conductive material around the opening 2.211.

In a partial number, e.g., five, of the electrically conductive graduation regions 2.21, bores 2.11 are arranged in the substrate 2.1 through an opening 2.211. The bores 2.11 are thus arranged along the first (inner) graduation track 2.2 or along the second graduation circle line C2 in the substrate 2.1. In the illustrated example embodiment, five bores 2.11 are provided, which have the same distance from the center point M and are arranged equidistantly (e.g., at a distance of) 72° along the second graduation circle line C2.

Figure 6:
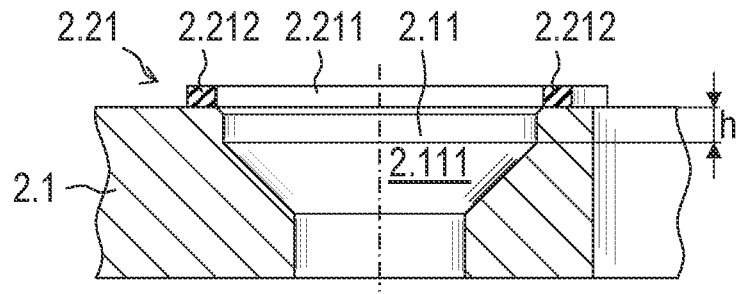
FIG. 6 is a cross-sectional view through a bore of the scale element.

FIG. 6 is an enlarged cross-sectional view through a part of the scale element 2 in the region of the first graduation track 2.2. In FIG. 6, the thickness of the layer of electrically conductive material of the electrically conductive graduation region 2.21 is illustrated exaggeratedly large for illustration purposes. The bore 2.11 is arranged as a stepped through bore. For example, the bore 2.11 has a conical region 2.111, which is produced, for example, by countersinking. The conical region 2.111 is arranged recessed by a dimension h with respect to the surface of the substrate 2.1 or in the axial direction. As a result, a fastening element 2.4, e.g., a screw or countersunk screw head, can be arranged in the bore 2.11, and the fastening element 2.4 is recessed with respect to the surface of the substrate 2.1 and with respect to the surface of the electrically conductive graduation region 2.21. The fastening element 2.4 is used to fasten the scale element 2 to a machine part and, for example, is made of steel and is therefore electrically conductive.

In the assembled state, the sensing element 1 and the scale element 2 are opposite one another with an axial distance or an air gap, so that, when there is a relative rotation between the scale element 2 and the sensing element 1, a signal depending on the respective angular position can be generated in each of the receiving conductive paths 1.1121, 1.1221, 1.1321, 1.1421 by induction effects. A prerequisite for the formation of corresponding signals is that the excitation tracks 1.111, 1.121, 1.131, 1.141 generate a time-varying electromagnetic excitation field in the region of the sensed graduation structures. In the illustrated example embodiment, the excitation tracks 1.111, 1.121, 1.131, 1.141 are arranged as a plurality of planar-parallel current-carrying individual conductive paths. The sensing element 1 has an electronic circuit with the electronic components 1.2, which are electrically connected to each other. The electronic circuit may also include an ASIC component. The signals generated by the receiving tracks 1.112, 1.122, 1.132, 1.142 are further processed by some of the electronic components 1.2 that form an evaluation circuit. This electronic circuit of the sensing element 1 operates not only as an evaluation element, but also as an excitation control element under whose control the excitation current is generated or produced, which flows through the excitation tracks 1.111, 1.121, 1.131, 1.141. Thus, the excitation tracks 1.111, 1.121, 1.131, 1.141 are supplied with current by one and the same excitation control element.

If the excitation tracks 1.111, 1.121, 1.131, 1.141 are energized, a tubularly or cylindrically oriented electromagnetic field is formed around the excitation tracks 1.111, 1.121, 1.131, 1.141. The field lines of the resulting electromagnetic field extend around the excitation tracks 1.111, 1.121, 1.131, 1.141, and the direction of the field lines depends on the direction of the current in the excitation tracks 1.111, 1.121, 1.131, 1.141. Eddy currents are induced in the region of the electrically conductive graduation regions 2.21, 2.31, so that a modulation of the field is achieved which is dependent on the angular position. Accordingly, through the receiving tracks 1.112, 1.122, 1.132, 1.142, the relative angular position can be measured. The arrangement of the first electrically conductive graduation regions 2.21, e.g., the positioning and dimensioning of the openings 2.211, provides for a suitable formation of the eddy currents, which can flow around the opening 2.211 over 360°, e.g., in the webs 2.212 made of electrically conductive material. The arrangement described herein provides for a comparatively compact configuration of the scale element 2 to be achieved without noticeably reducing the measuring accuracy. This is due to the fact that although the fastening elements 2.4 are integrated in the first graduation track 2.2, they do not affect the measurement result. For example, the electrically conductive graduation regions 2.21 that do not have a bore may have the same opening 2.211 as the graduation regions 2.21 with the bores 2.11 and with the fastening 10 elements 2.4. Additionally, the fastening elements 2.4 may be recessed in the axial direction.

What is claimed is:

1. A scale element for an inductive position measuring device, comprising:
   a substrate including at least one bore arranged in the substrate adapted to fasten the scale element to a machine part; and
   a graduation track arranged on the substrate, the graduation track being arranged along a measuring direction and including a periodic sequence of alternately arranged electrically conductive graduation regions and electrically non-conductive graduation regions, the electrically conductive graduation regions including a layer of an electrically conductive material, the electrically conductive graduation regions include an opening enclosed by the electrically conductive material;
   wherein, in at least one of the electrically conductive graduation regions, a respective bore is arranged in the substrate through the opening.

2. The scale element according to claim 1, wherein the graduation track is ring shaped.

3. The scale element according claim 1, wherein the openings in the electrically conductive graduation regions are geometrically identical.

4. The scale element according to claim 1, wherein the graduation track is ring shaped and extends along a graduation circle line having a center point, the openings being located at a same distance from the center point and being arranged equidistantly along the graduation circle line.

5. The scale element according to claim 1, wherein the graduation track is ring shaped and extends along a graduation circle line having a center point, a plurality of the electrically conductive graduation regions including a respective bore, the bores being located at a same distance from the center point and being arranged equidistantly along the graduation circle line.

6. The scale element according to claim 1, wherein the scale element is ring shaped and includes an inner diameter and an outer diameter, the outer diameter being less than three times the inner diameter.

7. The scale element according to claim 1, further comprising at least one fastening element arranged in the bore.

8. The scale element according to claim 7, wherein the fastening element is arranged flush or recessed with respect to the electrically conductive graduation regions.

9. The scale element according to claim 7, wherein the fastening element includes a screw.

10. The scale element according to claim 7, wherein the fastening element is made of an electrically conductive material.

11. The scale element according to claim 1, wherein a plurality of the electrically conductive graduation regions include a respective bore, the scale element including a plurality of fastening elements, each fastening element arranged in a respective bore.

12. The scale element according to claim 1, wherein the substrate is formed of a printed circuit board material.

13. The scale element according to claim 6, wherein the outer diameter is 1.4 times the inner diameter.

14. The scale element according to claim 1, further comprising a further graduation track arranged concentrically to the graduation track.

15. The scale element according to claim 14, wherein the further graduation track includes a further periodic sequence of alternately arranged electrically conductive graduation regions and electrically non-conductive graduation regions.

16. The scale element according to claim 1, wherein the electrically conductive material includes copper.

17. The scale element according to claim 15, wherein the graduation track is arranged concentrically within the further graduation track and includes a lesser number of electrically conductive graduation regions and electrically non-conductive graduation regions than the further graduation track.

18. The scale element according to claim 1, wherein the opening does not include the electrically conductive material.

19. The scale element according to claim 1, wherein a closed contour of the electrically conductive material surrounds the opening.

20. The scale element according to claim 1, wherein each electrically conductive region includes a respective opening and a subset of the electrically conductive regions include a respective bore.

* * * * *